Aug. 21, 1951    G. W. JESSUP    2,564,848
AUTOMATIC TRANSMISSION
Filed April 18, 1946    7 Sheets-Sheet 1
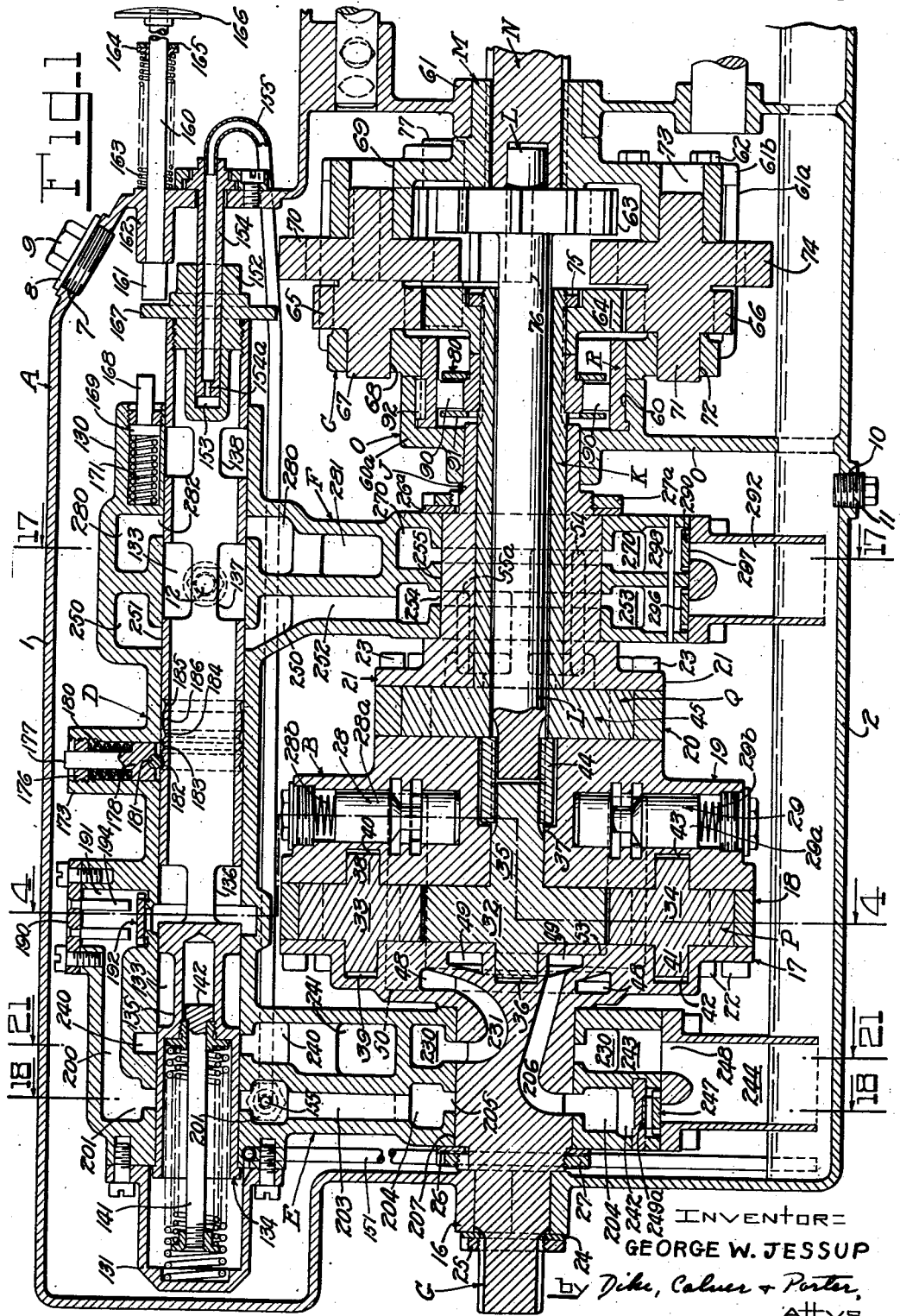
INVENTOR:
GEORGE W. JESSUP
by Dike, Calver + Porter,
Attys.

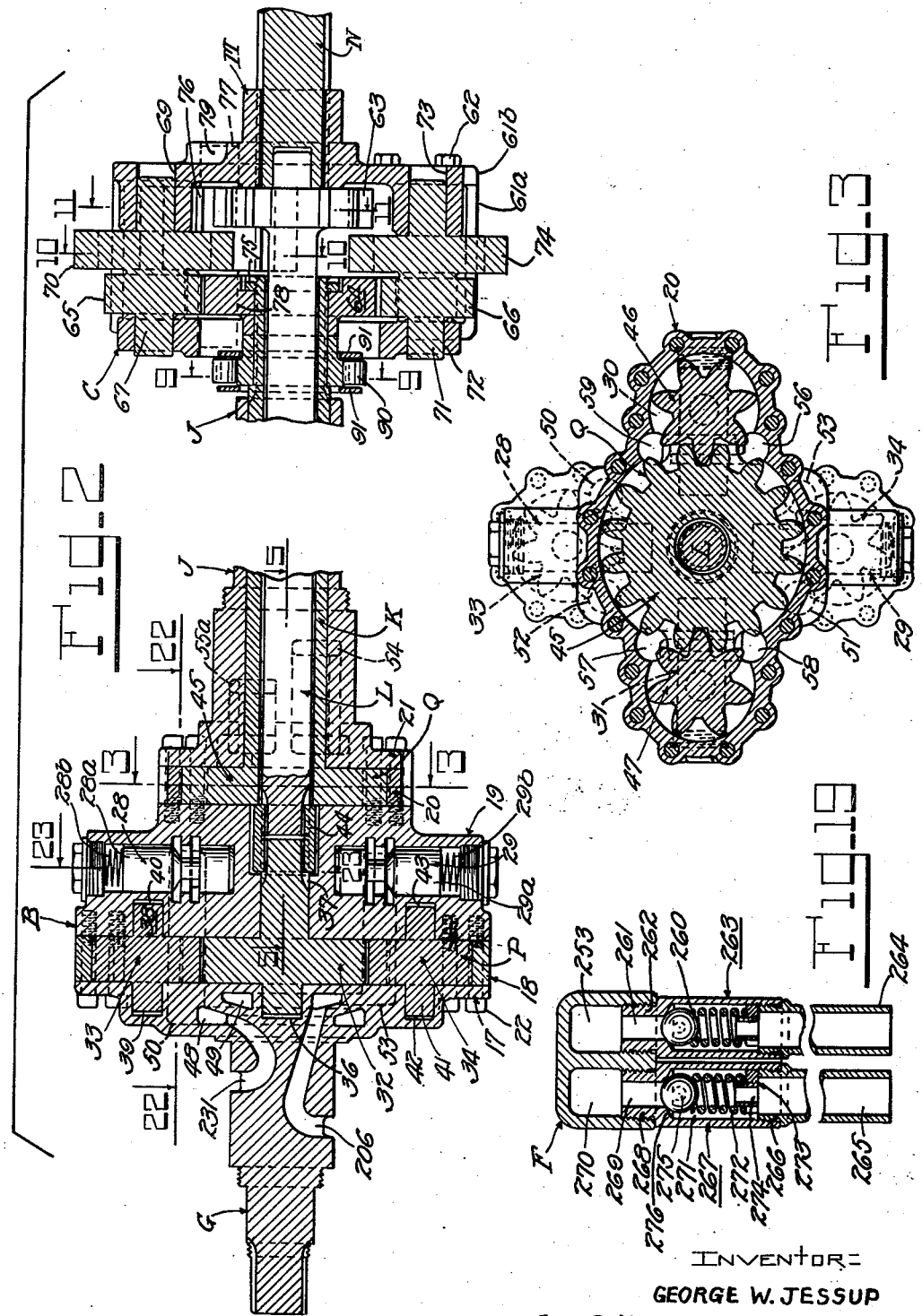

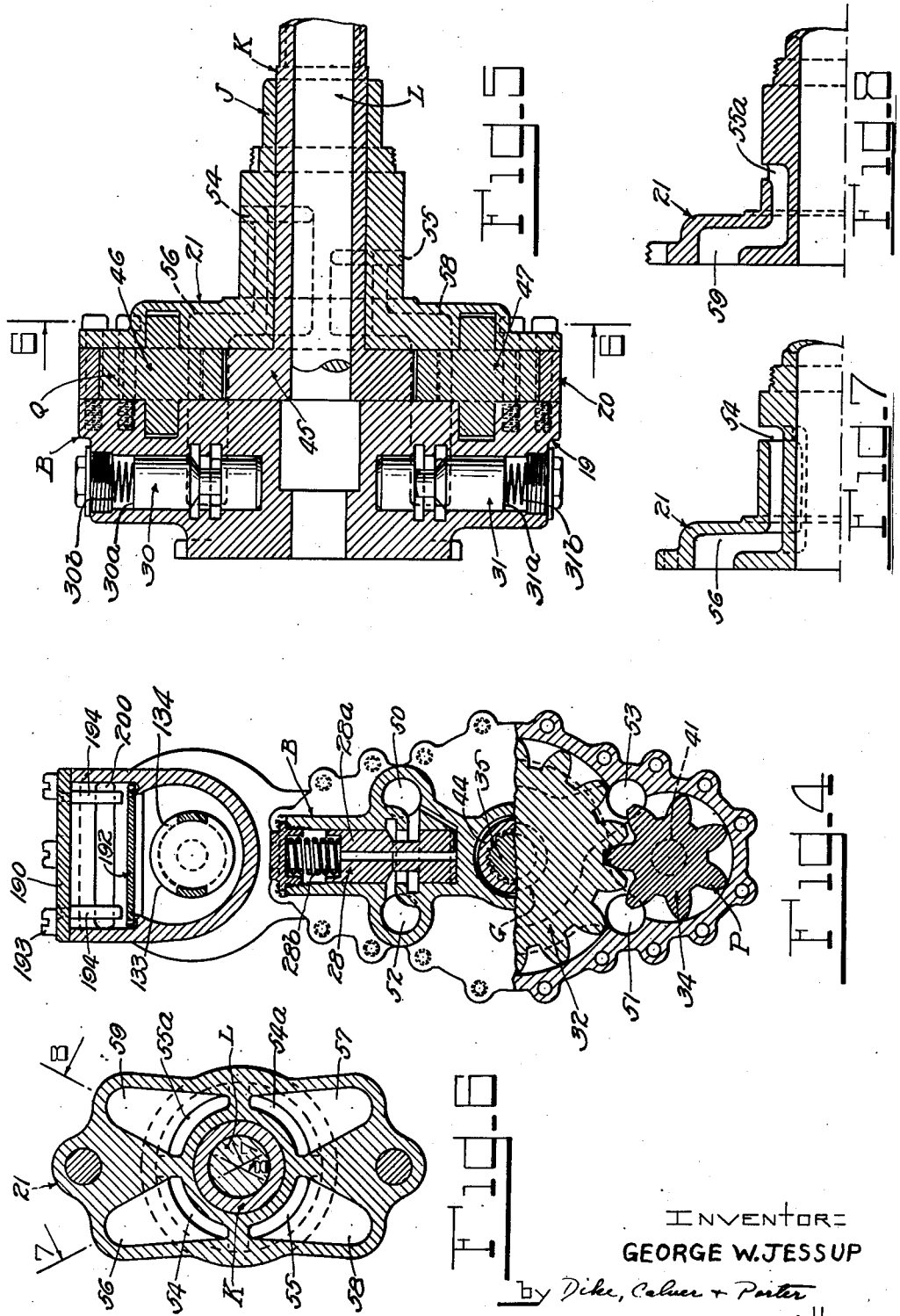

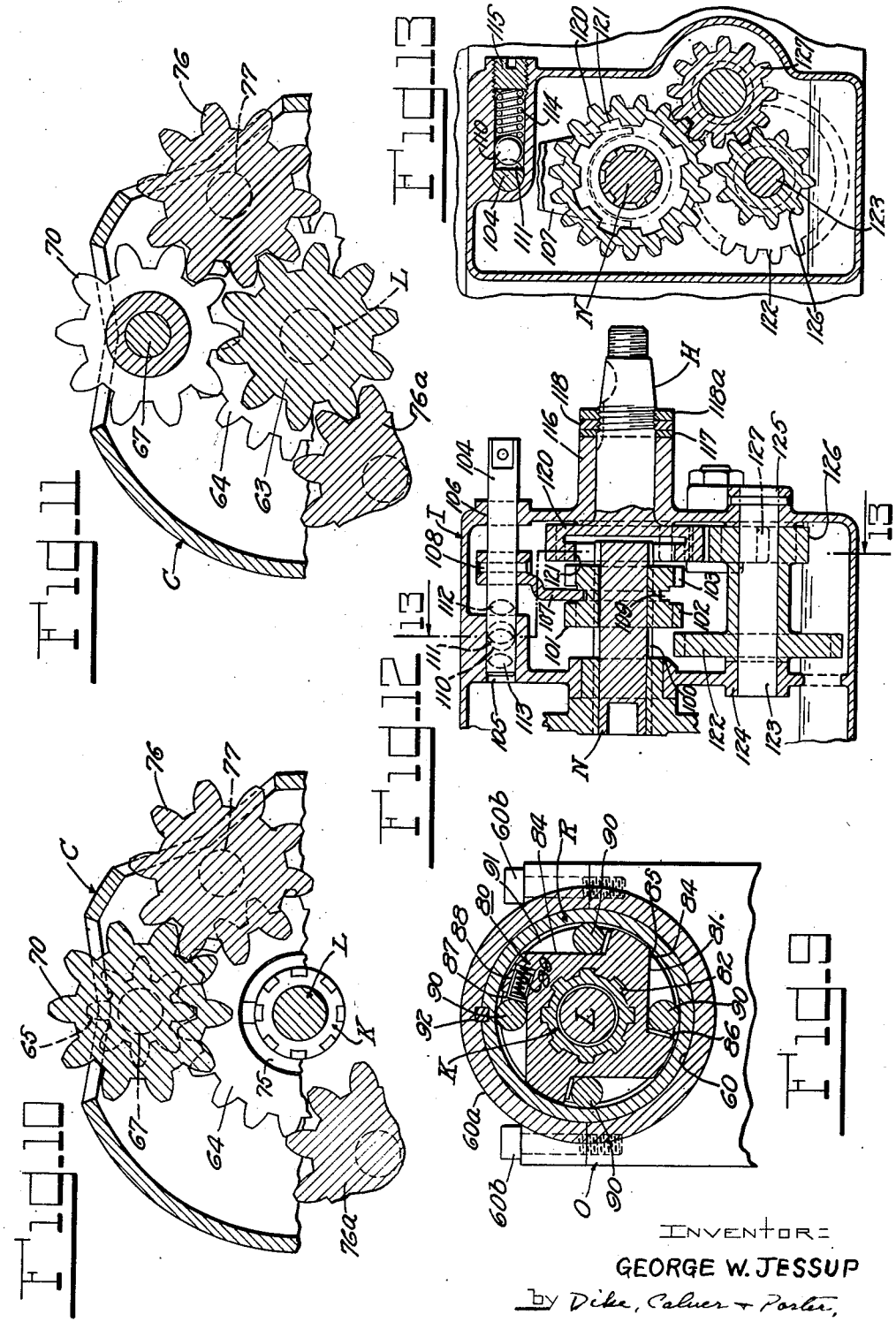

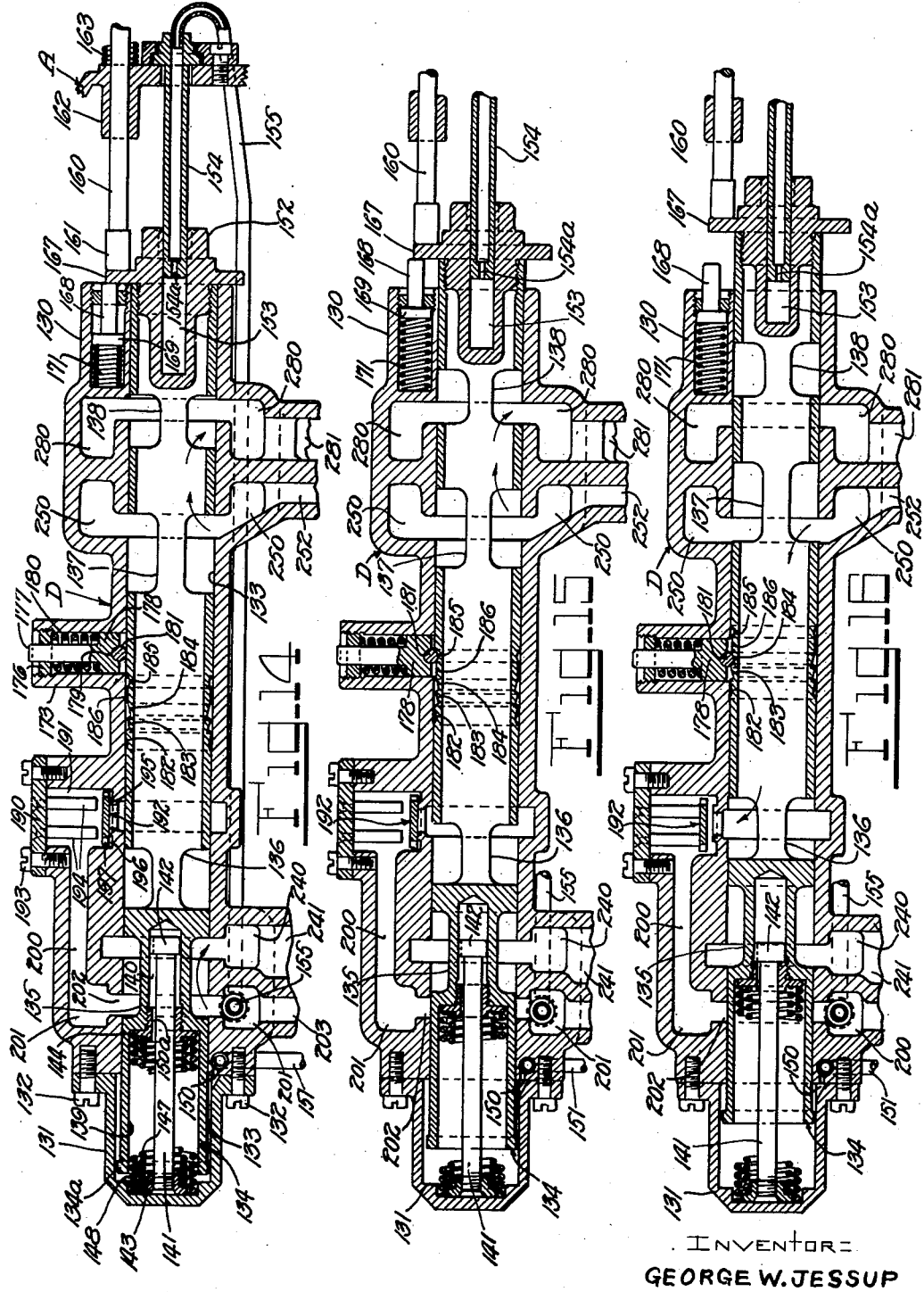

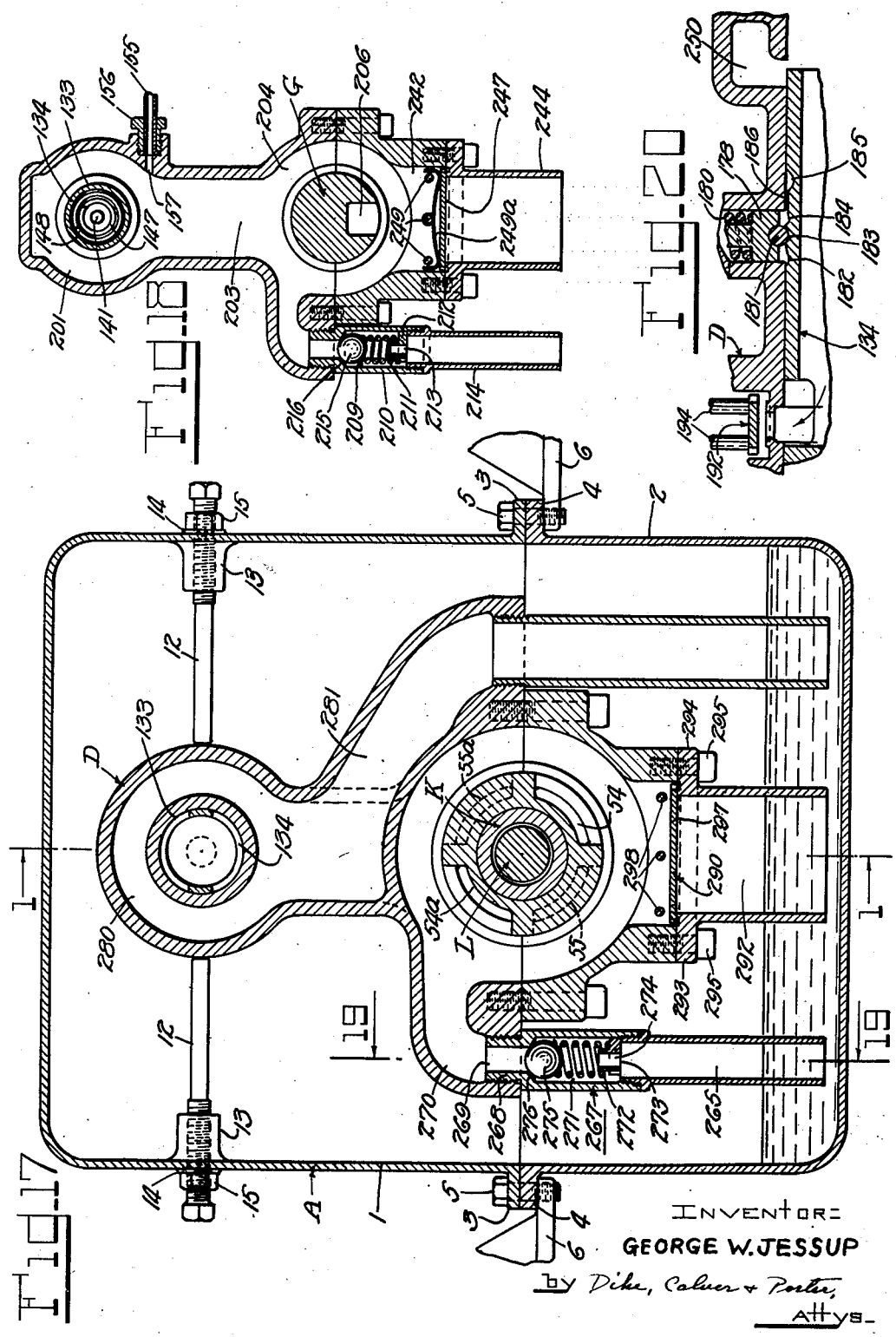

Aug. 21, 1951 G. W. JESSUP 2,564,848
AUTOMATIC TRANSMISSION
Filed April 18, 1946 7 Sheets-Sheet 7
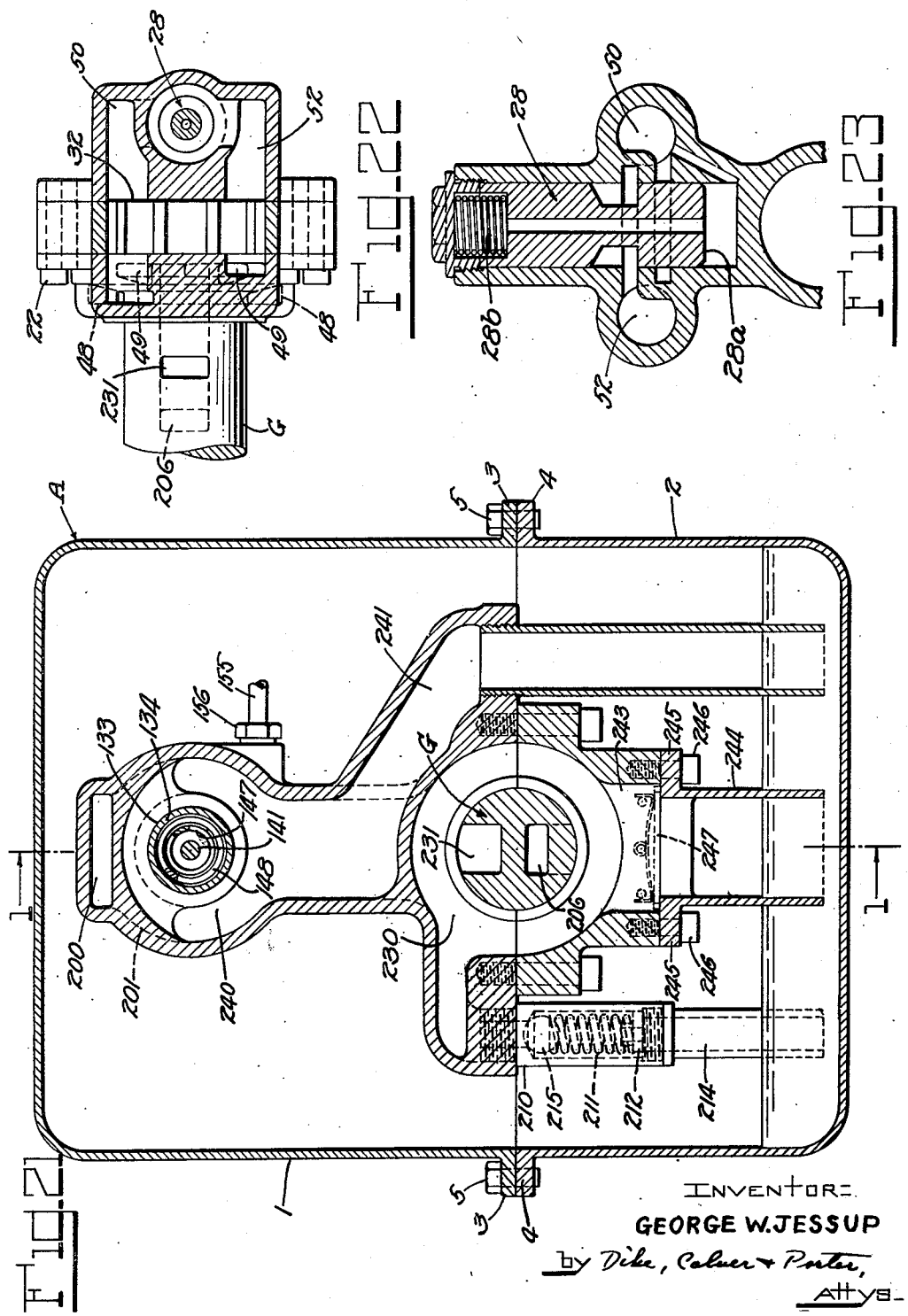
INVENTOR:
GEORGE W. JESSUP Patented Aug. 21, 1951

2,564,848

UNITED STATES PATENT OFFICE 2,564,848

AUTOMATIC TRANSMISSION

George W. Jessup, Waltham, Mass.

Application April 18, 1946, Serial No. 663,070

9 Claims. (Cl. 74—677)

This invention relates to an improvement in automatic transmissions, and more particularly to a type of automatic transmission in which hydraulic mechanism is operative in changing gear ratios from low to high with substantially continuous change in speed ratio between the driving and driven elements and continuous drive.

It is an object of the invention to permit the automatic change of speed ratios between the driving and driven shafts without the necessity of using complicated mechanical or electrical mechanism that is expensive to make and difficult to maintain and repair. It is also an object of the invention to dispense with a separate clutch mechanism, using a part of the automatic transmission itself both for the purpose of serving as a clutch and as a means for automatically bringing about the desired change in gear ratios. It is a further objects to give the operator a large degree of manual control even when the transmission does not require it. Other objects are to obtain a smooth, continuous drive during ratio changes; to eliminate the need for governors, brakes and friction clutches. Other objects will hereinafter appear.

In the drawings:

Fig. 1 is a vertical longitudinal section through the axis of the device embodying the invention, the section being on the line 1—1 of Figs. 17 and 21.

Fig. 2 is a detail view showing the major rotative parts of the device in section as in Fig. 1.

Fig. 3 is a vertical section on line 3—3 of Fig. 2.

Fig. 4 is a vertical section on line 4—4 of Fig. 1.

Fig. 5 is a horizontal section on line 5—5 of Fig. 2.

Fig. 6 is a section on line 6—6 of Fig. 5.

Fig. 7 is a section on line 7—7 of Fig. 6.

Fig. 8 is a section on line 8—8 of Fig. 6.

Fig. 9 is a section on line 9—9 of Fig. 2.

Fig. 10 is a section on line 10—10 of Fig. 2.

Fig. 11 is a section on line 11—11 of Fig. 2.

Fig. 12 is an extension of Fig. 1 (reduced in size) showing the gear box and mechanism for controlling the direction of rotation of the driven shaft.

Fig. 13 is a section on line 13—13 of Fig. 12.

Fig. 14 is a detail view in longitudinal section similar to that of Fig. 1 showing the main valve in neutral position.

Fig. 15 is a detail view in longitudinal section showing the main valve in another operative position.

Fig. 16 is a detail view in longitudinal section showing the main valve in a third operative position.

Fig. 17 is a section on line 17—17 of Fig. 1.

Fig. 18 is a section on line 18—18 of Fig. 1.

Fig. 19 is a section on line 19—19 of Fig. 17.

Fig. 20 is a segmental view in longitudinal section showing the main valve in a fourth operative position.

Fig. 21 is a vertical section on line 21—21 of Fig. 1.

Fig. 22 is a horizontal section taken substantially on line 22—22 of Fig. 2.

Fig. 23 is a section on line 23—23 of Fig. 2 showing an automatic relief valve in closed position.

The automatic transmission of my invention may for convenience in description be considered as having a casing A, a drive or impeller housing B, a driven or differential housing C, and a main valve system D having manifolds E and F (Fig. 1). Power and torque are received by the transmission through a shaft G connected to a suitable source of motive power (not shown). Power is transmitted by a driven shaft H (Fig. 12) which may be connected to any suitable mechanism to be driven such as the drive shaft of an automotive vehicle, etc. A portion I of the casing A shown in reduced scale in Fig. 12 contains mechanism for changing the rotative movement of the driven shaft H. The system of reversing gears may be of any suitable type. The portion I will be referred to as the "reverse gear box."

As shown separately in Fig. 2, the major rotating parts of the transmission, exclusive of the reversing mechanism of gear box I and the terminal driven shaft H, are the housing B with extensions forming shafts G and J, the differential housing C, and the shafts K, L, M and N.

Although the impeller B is driven by a source of power and the differential housing C drives the output shaft H, the impeller will be called the driving housing and the housing C will be called the driven housing because this describes the relationship of these two parts when considered together without reference to power input or output.

THE CASING

The casing A comprises essentially two parts; the upper section 1 and the lower section 2 provided respectively with flanges 3—3 and 4—4 secured together as by bolts 5 (Fig. 17). These bolts 5 may also be used to secure the flanges of the casing A to suitable supporting brackets 6—6 of a motor vehicle etc. The upper part 1 of the casing A has an inlet port 7 (Fig. 1), provided with a plug 8 having a vent 9. This vent is a "breather" which provides for atmospheric pressure within the casing, i. e., prevents compression or partial vacuum. The inlet port is for admission of a fluid, such as oil, to the system. The lower part 2, the bottom of which comprises a reservoir for the oil, is provided with a drain hole 10 normally filled with a plug 11. The fluid level is approximately that indicated (Fig. 1) and rises above the lower end of certain tubes hereinafter described. In the upper part 1 of the casing A (Figs. 1 and 17) are laterally extending threaded bolts 12 extending through projections 13 in the walls of the casing, and may be held properly tightened by lock washers 14 and nuts 15. These bolts bear against the valve body D and serve to prevent rotation of the valve and its attached manifolds.

THE HOUSING B AND ITS PLANETARY SYSTEMS

The splined driving shaft G is journalled in bearing 16 of the casing A. This shaft is an extension of part 17 of the housing B, which is made of housing parts 17, 18, 19, 20 and 21. Parts 17, 18 and 19 are secured together by bolts 22, and parts 19, 20 and 21 are securely held together by bolts 23. An extension or stem of part 21 forms the shaft J which is journalled in bracket O of the casing A. Displacement of the housing B is prevented by washer 24 and nut 25 on shaft G. Washer 26 and nut 27 around shaft G, and washer 26a and nut 27a around shaft J, prevent displacement of manifolds E and F respectively. Shaft G and housing B are rotated counterclockwise as viewed in Fig. 4.

The housing B has two planetary systems having their major axes disposed at 90 degrees to each other. The forward system P (see Figs. 1 and 4) and the rearward system Q (see Figs. 1 and 3) are alike in construction. Between them in part 19 of the housing B are interposed automatic relief valves 28 and 29 for system P (Figs. 1 and 2) and similar automatic relief valves 30 and 31 for system Q (Fig. 5). They are all alike in construction, and all are operated by centrifugal force derived from housing B. One automatic valve can be used for each system instead of two if the conduits are connected, but two (i. e. one for each planetary gear) balance the rotary housing.

As shown more clearly in Fig. 4, the forward system P has a sun gear 32 which meshes constantly with two opposing planet gears 33 and 34. One planet gear could be used, but two provide proper balance. Sun gear 32 is mounted on a splined shaft 35 that is journalled in bearings 36 and 37 in the housing B. Planet gear 33 is mounted on a shaft 38 journalled in bearings 39 and 40 of the housing, and planet gear 34 is similarly mounted on a shaft 41 journalled in bearings 42 and 43. Splined shaft 35 is keyed to the forward end of the splined shaft L by coupling 44.

The system Q (Figs. 3 and 5) is like system P in construction. Sun gear 45, however, is fixed to the tubular shaft K which surrounds shaft L. There are two planet gears 46 and 47, although one would suffice, in which event there would only be one automatic valve for system Q. Tubular shaft K passes through hollow shaft J.

A ring-shaped channel 48 and a second ring-shaped channel 49 are formed in part 17 of housing B. Channel 48 communicates with intake conduits 50—51 and channel 49 communicates with exhaust conduits 52 and 53. These conduits or ducts all extend through housing B to the automatic relief valves 28 and 29, (Figs. 3 and 4). Channels 54, 54a, 55 and 55a are formed in part 21. Channels 54 and 54a communicate with intake ducts 56 and 57 respectively, and channels 55 and 55a communicate with exhaust ducts 58 and 59 respectively.

The four automatic relief valves (see Figs. 1 to 5 inclusive) are similar to the automatic relief valves heretofore fully described in my copending application, Serial No. 612,234, (filed August 23, 1945) now Letters Patent No. 2,502,092, granted March 28, 1950, except that the lowermost position of each of the pistons 28a to 31a inclusive is an open instead of a closed position, and it is only necessary to have in each valve a single spring 28b, 29b, 30b and 31b tending to urge the respective pistons inwardly against centrifugal force. Thus the present valves have an inner open position corresponding to the intermediate open position of the former valves, and an outer closed position similar to the outer closed position of the former valves instead of having both an inner and outer closed position and an intermediate open position as do those of the copending application aforesaid. The function of these valves is otherwise as described in the application aforesaid, to permit the fluid to by-pass the gears of the planetary systems to which the automatic valves are attached whenever the housing B rotates below a predetermined speed and the operation of the system demands release of the sun gears from their planet gears in order to permit the planet gears to revolve with the housing without rotating the sun gears. The mode of operation of these valves is more fully described hereinafter.

Planetary systems P and Q and the drive housing B in which they are placed may together be considered a "main driving unit" in that on co-action in the drive between the respective sun gears of the planetary systems and the impeller B, they act as a unit in driving the differential housing C. The term "main driving unit" will be used to designate this combination of planetary systems P and Q and the impeller B.

THE DIFFERENTIAL MECHANISM

The differential housing C is journalled on a tubular bearing R that is held in a socket 60 formed in the bracket O. Socket 60 has a cap 60a held to the lower part of the bracket O by screws 60b. The opposite side of the housing C has an extended portion forming shaft M which is journalled in bearing 61 in casing A. Shaft M is fixed to shaft N as by splines. The casing sections 61a and 61b of housing C are secured together by screws 62. The housing C has two sun gears 63 and 64. Sun gear 63 is secured to shaft L, while sun gear 64 is secured to shaft K. Two planetary gears 65 and 66 mesh with sun gear 64. Planet gear 65 is fixed to a shaft 67 journalled in bearings 68—69 in the housing C to which is also fixed a larger gear 70. Likewise planetary gear 66 is fixed to shaft 71 journalled in bearings 72 and 73 in housing C to which is also fixed a larger gear 74.

Sun gear 64 is keyed to splined shaft K and held by a lock nut 75. Meshing with sun gear 63 is a pinion 76 (see Figs. 10 and 11) secured to a shaft 77 journalled in bearings 78 and 79 in the housing C (Fig. 2). Pinion 76 also meshes with gear 70. A second pinion 76a meshes with gears 63 and 74. Gears 66, 74 and 76a function in the drive, but are principally for the purpose of balancing the strains in the differential, which would work without them.

Gears 76 and 76a are idler gears, serving to cause gears 70 and 74 to turn in the same direction as gear 63. The gears of the differential are so proportioned that gear 63 has an advantage in the drive over gear 64. The over-all reduction shown is approximately 3½ to 1 when gear 63 is driving the housing and gear 64 is held against counter-rotation. The housing C will only revolve 2/7 as fast as gear 63 when gear 63 alone is driving. This combination gives the "low gear" drive, i. e., first speed.

A roller brake 80 (see Figs. 1 and 9) surrounds shaft K. A brake part 81 fits splines 82 on the shaft. The brake member 81 is provided with cam notches 84 cut in the peripheral part thereof. These notches 84 as shown in Fig. 9 have a long wall 85 and a short wall 86. The long wall is substantially tangential to the shaft, while the short wall is nearly perpendicular thereto, the angle between the walls being slightly obtuse. A plunger 87 is provided in a bore 88 in each of the short walls, and is normally maintained in outward position by a spring 89. Each notch 84 is provided with a roller 90 held in place by disks 91. The purpose of the brake 80, as hereinafter explained in greater detail, is to prevent the shaft K from rotating in a direction opposite to the main drive, i. e., clockwise as shown in Fig. 4. The rollers 90 are normally pushed up the incline of the cam notches by the springs 89. The rollers 90, on any tendency to clockwise movement of the member 81 in Fig. 9, are caused to be wedged between the brake part 81 and the sleeve R keyed at 92 to the socket 60 of the bracket O and prevent rotation. Member 81 is free to turn counter-clockwise, as the springs 89 are pushed in, providing space for the rollers 90 so that they do not bind.

The housing C is referred to as a "differential" housing and the gear train disposed therein is termed a "differential gear train" in the sense that they provide mechanism of the "double power path" type; either end of the gear train may be driven to effect different rotative speeds of the housing, as will later appear. The housing C and its planetary type constantly meshed gear train in which two planetary systems are joined by an intervening gear may together be termed a "main driven unit" for convenience in designation, as they may be regarded as acting as a unit in receiving the drive from the driving unit of the transmission.

THE REVERSE GEAR BOX

The gear box I (Fig. 12) is provided with suitable shifting mechanism for controlling the direction of rotation of the shaft H. The shaft N which is driven by housing C is splined as indicated at 100 and drives a spool 101 slidably mounted thereon. Gear teeth 102 are formed on one side of the spool 101 and clutch teeth 103 are formed on the other side. The spool is operated by a manual control rod 104 which fits freely in bores 105 and 106 in the casing I. A prong 107 is secured to the rod 104 by a pin 108. The prong extends into a groove 109 in the spool. Rod 104 is lightly held in neutral, forward or reverse position of the spool 101 by a ball 110 (Fig. 13) which is forced into detents 111, 112 and 113 by the action of spring 114 held by a screw plug 115. The shaft H journalled in bearing 116 is held by a washer 117 and nuts 118 and 118a. Secured to the inner or forward end of the shaft H is a gear 120 on the inside of which are clutch teeth 121 which fit freely over the clutch teeth 103 on the spool 101. A gear 122 is rotatably mounted on a shaft 123 fixed in bearings 124 and 125 in the casing I. Gear 102 meshes with gear 122 when the spool 101 is moved to the left of Fig. 12. Secured to gear 122 and rotatably mounted on shaft 123 is a gear 126 which meshes with an idler gear 127 which in turn meshes with gear 120 on the shaft H. When the spool is moved to the right in Fig. 12 the clutch teeth of the spool engage with clutch teeth 121 and drive the shaft H in the same direction of rotation. When gear 102 engages with gear 122 the direction of rotation of the output shaft H is reversed due to the idler gear 127 in the gear train.

THE MAIN CONTROL VALVE

The valve body D (see Figs. 1, 14, 15 and 16) is the controlling mechanism by which the operator engages the clutch and also the mechanism which automatically determines the speed ratio settings of the automatic transmission. The clutch body D has a main casing 130 the forward end of which is provided with a cylinder head 131 secured to the body 130 by screws 132. The cylinder head 131 and the main portion 130 of the body D encompass an elongated cylinder 133 in which a long tubular piston 134 having a flanged cap 134a is reciprocally movable. The piston 134 has formed in its circumference a ring channel 135 and a series of slots 136, 137 and 138. The slots allow fluid inside the tubular piston to reach the cylinder 133. The forward end of the piston 134 has a bore 139 leading to a smaller bore 140. The rod 141 having a head 142 and a cap 143 is held longitudinally in the bores 139 and 140. A cap 144 surrounding the rod 141 at the juncture between bore 139 and bore 140 is screwed into the bore 140. Surrounding the rod 141 in the bore 139 are two springs 147 and 148. Spring 147 is held between cap 143 and cap 144. Spring 148 is held between head 131 and cap 144. From the portion of the cylinder inside the cap 131 there is a duct 150 leading to a pipe 151 which leads (Fig. 1) to the bottom of the reservoir. This duct permits oil to fill bore 139, so that it helps to slow the forward movement of piston 134 to make changes from high to low speeds more gradual. A groove 150a in cap 144 (Fig. 14) permits some of the cylinder oil to reach the space in bore 140 between head 142 and cap 144, and the fact that oil in this space is forced through a small opening tends to retard the backward movement of the piston 134 (to the right in Fig. 14). The rearward end of the tubular piston 134 is closed by a screw cap 152 having a cylinder bore 153 reciprocally movable over a tubular plunger 154, the head end of which has an opening 154a. The outer end of the plunger is connected with a tube 155 which in turn is connected to the manifold E by a plug 156 in a bore 157 in the manifold body (see Fig. 18). A plunger rod 160 (Fig. 14) having a head 161 is slidably movable through a bearing 162 formed in the casing A. A spring 163 has one end thereof resting against the outside of the casing A and the other end held against a collar 164 (Fig. 1) held on the rod 160 by a pin 165. The outer end of the rod is provided with a pad 166. The head 161, whenever the plunger is moved to the left in Fig. 14, comes against the rim 167 of the cap 152 (Fig. 16). On further movement to the left by the cap 152 as shown in Fig. 15 the rim 167 engages a plunger 168 having a head 169 on the plunger 168. Further movement to the left as shown in Fig. 14 causes compression of spring 171. A projecting portion 173 on the valve body D is threaded at its outer end to receive a plug 176. Through the plug 176 extends a rod 177 having a head 178 provided with an arcuate notch 179. A spring 180 held compressed between the plug 176 and the head 178 forces the notch 179 downwardly on a ball 181 causing it, on proper positioning of the piston 134, to be pressed into shallow cam grooves or detents 182, 183, 184 and 185. The profile of these several cam grooves is such that more force is required to move the piston 134 on the return stroke (to the right in Fig. 20), than to move it in a forward direction (to the left in Fig. 20). A dwell portion 186 is provided which does not force the ball upwardly against the head of the plunger.

A cover plate 190 (Fig. 14) closes a passage or chamber 191 for a valve 192 and may be secured to the body D as by screws 193. Extending downwardly from said cover are two pins 194, 194. Clearance is provided between the valve plate 192 and the pins to allow the valve to lift from its seat 195. The gutter 196 surrounds the valve seat 195 to reduce the surface to be fitted, and allow the fluid passing through the valve to escape more readily when the valve is open. The plate 192 has prongs 197 which fit freely between the side walls of the lower part of the passage 191. These allow escape of fluid when the valve is open.

THE MANIFOLD SYSTEM

The manifold E is provided for the circulation of fluid between the main valve D and the system P. The valve body D, as presently constructed, provides a part of the manifold body, i. e., the structures are integral so that there is no distinct separation. As shown in Fig. 14, there is a horizontal chamber 200 in the upper forward end of the valve casing D which communicates with the passage 191 and also communicates with ring chamber 201 which has a ring-shaped aperture 202 communicating with the cylinder 133 of the valve casing D. The ring chamber 201 communicates with a passage 203 (Fig. 1) in the manifold body E which leads to another ring chamber 204 also formed in the body of the manifold E. The ring chamber 204 has a ring-shaped aperture 205 communicating with passage 206 in the shaft G as it revolves within the bore 207 in the manifold body E. Conduit 208 communicates with ring chamber 49 in the section 17 of the housing B. Ring chamber 204 also communicates with a valve chamber 209 (Fig. 18) in the upper part of a valve body 210. Valve chamber 209 encloses a spring 211 the lower end of which rests on a plug 212 having a bore 213 and resting on the upper end of a tube 214 which is screw threaded into the lower end of the valve body 210. The upper end of the spring bears against a ball 215 and normally holds it against a valve seat 216 formed in the upper end of the valve body 210. This valve 210 is a pressure release valve which prevents overload in the exhaust line from the planetary system P. As shown in Fig. 21, the ring chamber 230 communicates on rotation of the shaft G in the bore 207, with a conduit 231 which leads to ring chamber 48 formed in section 17 of the housing B.

A ring chamber 240 is also formed in the casing of the valve body D. This ring chamber 240 communicates with the cylinder 133 of the valve body and with an outlet 241 which extends to the bottom of the reservoir. Ring chambers 204 and 230 both communicate with chambers 242 and 243. A tube 244 having flanges 245 is secured to the manifold body by bolts 246. Valve cap 247 rests on the upper end of tube 244 and is prevented from rising too far by pins 249. A spring 248a presses cap 247 on its seat against a pressure less than atmospheric. Valve cap 247 operates as an intake valve when the transmission drive is reversed, as when the vehicle drives the engine. An opening 248 serves as an inlet port during low and direct drive and as an outlet during second and third, as if the drive is reversed.

The manifold F is similar in construction to the manifold E. A ring chamber 250 (Fig. 1) formed in the valve body D is open to the cylinder 133 at 251. Chamber 250 communicates with a conduit 252 which leads to a ring chamber 253. Ring chamber 253 communicates at 254 with the bore 255 through which the shaft J passes. On rotation of the shaft, chamber 253 communicates with conduits 55 and 55a formed in the casing 21 of the housing B (Figs. 1 and 5). Ring chamber 253 also communicates with valve chamber 260 (Fig. 19) through a tube 261 in the threaded end 262 of a valve body 263 screw threaded to a tube 264 extending into the bottom of the reservoir. A tube 265 adjacent tube 264 has its upper end screw threaded at 266 to the lower end of a valve body 267 screw threaded at its upper end at 268 to the manifold body F and communicating through a bore 269 with ring chamber 270. The valve body 267 has a valve chamber 271 enclosing a spring 272 having its lower end bearing on a plug 273 having a vent 274 and the upper end of the spring bears against a ball 275 normally pressed against a valve seat 276 formed in the upper end of the valve body. Valves 263 and 267 are similar in construction. They are both pressure release valves. Valve 267 is for releasing any excess pressure developed in the exhaust line of planetary system Q; valve 263 acts as a pressure release valve for the intake line of planetary system Q when the transmission drive or torque is reversed and the intake temporarily becomes an exhaust, as when the vehicle drives the engine.

A ring chamber 280 in the valve body D leads to an outlet 281 which extends to the bottom of the reservoir. Ring chamber 280 communicates at 282 (Fig. 1) with the cylinder 133 of the valve body. Chamber 270 also communicates with conduits 54 and 54a in part 21 of housing B (Fig. 17).

As shown in Fig. 17, the ring chamber 270 communicates with valve 290. This valve is like valve 247 (Fig. 21) in construction and function except that no spring is used to hold the valve cap on its seat. The valve 290 has a tube 292 provided with flanges 293 and 294 secured by bolts 295—295 to the manifold body F. Overlying the top of the tube 292 are caps 296 and 297 which are permitted to rise slightly but not very far by pins 298. Valve cap 297 is the usual intake valve for planetary system Q; valve cap 296 serves as intake when the transmission drive is reversed as when the vehicle drives the engine and the exhaust line becomes an intake line.

OPERATION

Starting with manual control

Before the engine is started the operator will usually place the gear spool 101 in neutral position and push clutch pad 166 all the way in. This moves the piston 134 to the extreme left in cylinder 133 as shown in Fig. 14. In this neutral position, because of the position of channel 135 and slots 137 and 138 in piston 134, ring chambers 201 and 240 are in communication through cylinder 133 and so are chambers 250 and 280. Ring chambers 201 and 240 are in communication through channel 135, and ring chambers 250 and 280 communicate through the hollow piston between slots 137 and 138. Valve 195 is shut off by piston 134, so that oil cannot pass from manifold F to manifold E. Ball 181 is not in any of the cam detents of the piston 134. Springs 147, 148 and 171 are all compressed. When the engine is started, it immediately drives housing B counter-clockwise (Fig. 4). Any speed slightly over idling speed is enough to close the centrifugally operated valves to prevent by-passing of oil. The rotation of housing B also causes planet gears 33, 34, 46 and 47 to rotate on their axes about the stationary sun gears 32 and 45. The rotation of the planet gears forces oil from their respective intake to their respective exhaust conduits. The circulation through planetary system P is from the reservoir up tube 244 (Fig. 1) through opening 248 to chamber 230, through conduit 231 to chamber 48, and through the gear intake ducts 50 and 51 (Fig. 4). The oil fills the spaces between the gear teeth and is expelled by the rotating planetary gears into exhaust ducts 52 and 53. From these exhaust ducts it passes to ring chamber 49, through passage 206 to ring chamber 204 and up through passage 203 to ring chamber 201. It passes through ring channel 135 in the piston 134 as indicated by the arrow (Fig. 14) to ring chamber 240, thence through outlet or return pipe 241 to the reservoir.

The flow of oil through planetary system Q takes place in the same manner. Oil is drawn from the reservoir through pipe 292 (Fig. 17) through the inlet valve to ring chamber 270 (Fig. 1) thence through conduits 54 and 54a (Fig. 5), to intake ducts 56 and 57 of the system Q. The rotating planetary gears 46 and 47 force the oil into exhaust chambers 58 and 59 from which it passes through passages 55 and 55a to ring chamber 253 in the manifold F. From ring chamber 253 it passes through conduit 252 to ring chamber 250, through slot 137 to the interior of hollow piston 134 as shown by the arrow (Fig. 14) and is forced through slot 138 into ring chamber 281. Thereafter, it passes through outlet 280 to the reservoir. During this cycle of the circulation, both planetary systems are drawing oil from the reservoir and returning it to the reservoir. The planet and sun gears are not locked, and there is no drive on the differential system. The position shown in Fig. 14 is, therefore, the neutral position of the valve.

Oil also passes from ring chamber 201 through tube 155 to plunger 154, and through bore 154a to fill the chamber 153 (Fig. 14). The cylinder 153 will, therefore, be full of oil and the pressure exerted by this oil will tend to counteract slightly the impulse of springs 147, 148 and 171 tending to return the piston 134 to its original position toward the right in Fig. 14 but cannot prevent shifting. Allowing the engine to idle, the operator shifts the gear spool 101 into forward or reverse. At this point the operator will open the throttle. He can release the pedal immediately but should preferably let up on the pedal slowly or by degrees to obtain manual control over the speed ratio setting of the transmission. Since he can easily detect differences in pressure on the pedal 166, he is able to select the gear ratio he desires, and as he gradually releases the pedal, he opens the throttle wider. Usually, he will select a speed ratio corresponding to "first" or low. If he releases the pedal entirely, however, the transmission will not ordinarily go immediately into high, as the oil pressure developed will usually prevent shifting to such an extent.

*First speed*

In the position of the piston 134 shown in Fig. 15, channel 135 has passed sufficiently to the right so that chamber 201 no longer communicates with chamber 240. Chambers 250 and 280 of manifold body F are still in communication via the slots 137 and 138 through the walls of tubular piston 134. The planetary gears of system P are no longer able to turn because oil cannot escape from ring chamber 201 or any part of the exhaust system from chamber 201 to the exhaust ducts 52 and 53. Since the planetary gears are not able to turn, they lock with the hitherto stationary sun gear 32 and the housing B turns the sun gear 32 counter-clockwise as viewed in Fig. 4, and, acting through shaft L, likewise turns differential gear 63 counter-clockwise. Thus the housing B and planetary system P coact as a driving unit to drive gear 63 of the differential system. The counter-clockwise movement of gear 63 causes pinions 76 and 76a to rotate clockwise (Figs. 10 and 11) and gears 70 and 74 driven by said pinions to turn counter-clockwise, i. e., in the same direction of rotation as gear 63 and housing B. However, planetary gears 70 and 74 are fixed on the same shafts 67 and 71 as planet gears 65 and 66 and rotate them counter-clockwise. Planetary gears 65 and 66 mesh with sun gear 64. This sun gear cannot be moved clockwise, as it is splined to shaft K and shaft K is prevented from rotating clockwise by brake 80. When roller brake body 81 (Fig. 9) is urged in a clockwise direction, rollers 90 become wedged in the cam slots 84 and thus jam against stationary ring or sleeve 91 keyed at 92 in the bearing 60 to bracket O. Consequently, since sun gear 64 is not allowed to rotate clockwise, planetary gears 65 and 66 are rotated about stationary gear 64. Since the planetary gears 65 and 66 are journalled in casing C, they cause the whole differential casing C to rotate counter-clockwise. In this manner the driving unit drives the driven unit in a speed setting equivalent to "low." The rotation of housing C causes rotation of shaft N, and if spool 101 in casing I is shifted out of neutral position, drive shaft H will be rotated in either direction according to the position of the spool 101. Sun gear 63 has a distinct mechanical advantage over sun gear 64. The over-all reduction shown is approximately 3½ to 1. The result is that while sun gear 64 is held by brake 80 against rotation, and sun gear 63 is driving, the housing C is rotated around the stationary gear 64 only $2/7$ as fast as sun gear 63 is rotating. This combination gives a speed reduction on the output shaft that will be referred to as first speed or low and approximates low gear or "first" in automotive vehicles with ordinary transmissions.

During this time, the unlocked planet gears of system Q are rotated by housing B freely about the sun gear 45, which is held stationary because shaft K cannot turn. The rotation of these planet gears causes oil drawn through intake tube 264 to be forced, through the same system of chambers, ducts and conduits heretofore mentioned, but this oil on reaching ring chamber 201 is passed as shown by the arrows (Fig. 15) back to the reservoir through tube 280, so that the rotation of the planetary gears in system Q is not impeded. The system, therefore, is not driving, but is merely circulating oil through itself while the first speed setting is maintained.

Second speed

When the planet gears 33 and 34 are locked by the non-circulating oil so that they drive the sun gear, the pressure they exert on the trapped oil depends on the effort required to turn the sun gear 32. This may be termed the holding effort required. As the vehicle and the engine both pick up speed, the holding effort and the torque supplied by the engine are reduced. The engine produces much more torque at low speeds than it does at high speeds. From usual idling speeds the torque increases rapidly and reaches its maximum at moderate speeds and thereafter decreases as the engine nears its maximum speeds. Thus the best torque readings are obtained nearer the low speeds than the high speeds of the engine. This must be clearly appreciated because the shifting of my transmission, except for the degree of manual control mentioned, depends on the increase or decrease of torque. When the vehicle picks up speed in low gear and reduces the effort required to turn gear 32, the engine also picks up speed and eventually the torque is decreased. When this happens, the planet gears 33 and 34 do not exert as much force against the oil in their exhaust ducts, and so the pressure of oil in the cylinder 153 becomes insufficient to hold the piston 134 forward against the force exerted by springs 147 and 148. Unless the pedal 166 is held in first speed setting by the operator, these springs overcome the decreased resistance of the oil and the resistance caused by the spring pressed ball 181 in its detent 185, and the piston 134 is moved backward to the position shown in Fig. 16. In this position of the control valve the transmission approximates the "second gear" of ordinary transmissions. It should be understood that whether the piston is moved to this position or not depends on a balance of the forces exerted by the springs 147 and 148 and the resistance to those forces by the oil in the piston 134 together with the resistance provided by the ball 181 and its detents. The resistance provided by the oil is, of course, the variable factor. If the load is so great in first that the engine is not allowed to speed up sufficiently, the torque and oil pressure will remain high and prevent shifting even though pedal 166 is released. Otherwise, release of the pedal permits shifting from low to second speed. Shifting from first to second can be delayed somewhat by the operator by controlling the engine speed to make is produce a high torque and high oil pressure, or favored by decreasing the torque, and, consequently, the oil pressure. Whether the piston stops in the position of Fig. 16 or continues through it immediately to that shown in Fig. 1 depends on the same principles, i. e., the relative effect of spring pressure and oil pressure, as changed by increased or decreased torque.

As shown in Fig. 16, ring chamber 201 is still shut off from communication with chamber 240. Consequently, planetary gears 33 and 34 are not released and continue to turn sun gear 32 which drives sun gear 63 in the differential C. This occurs in every position except the neutral position of Fig. 14. Ring chambers 250 and 280 are no longer in communication through slots 137 and 138 in the hollow piston 134 however, and the oil that is forced into chamber 250 by the rotating planet gears of system Q is forced through slot 136 in the piston and through valve 195 to passage 200 communicating with ring chamber 201. Ball 181 is now pressed in the second detent 184, and the combined resistance of the oil on the piston and the resistance of the ball and detent are assumed to be sufficient to check the backward movement of the piston 134, as will ordinarily happen. Of course the combined resistances can conceivably be so slight that the transmission might go from first to direct without pausing. Fig. 16, therefore, represents a position in which the two springs beforementioned have overcome the resistance of the oil in system P sufficiently to move the piston into the position shown for "second speed" but have not been able to shift the transmission into direct drive. Since the oil circulated by system Q is not stopped but is allowed to pass from manifold F to manifold E, it causes reverse circulation of oil in manifold E and is forced from the exhaust ducts, between the planet gears and sun gear of system P, and to the intake ducts. Thereafter it passes out through the opening 248 in intake tube 244 (Fig. 1) and back to the reservoir. Instead of planet gears 33 and 34 being merely prevented from turning on their axes by reason of the fact that circulation of oil in manifold E from intake to exhaust lines is prevented, they are now positively rotated by the reverse flow so that they drive the sun gear 32 counter-clockwise faster than it is driven when the planet gears are simply locked and the speed of the housing determines the speed of the sun gear. In other words, the planet gear 32 is being turned by two forces, first by the rotating housing B and second by the flow of oil provided by system Q. The sun gear 64 is still prevented from turning clockwise by the brake 80, so that the planet gears 65 and 66 are still rotated about the stationary sun gear 64 which still serves to take the torque, and provide the resistance enabling the housing C to be turned. Systems P and Q and housing B now all cooperate as a driving unit to turn the differential unit in second speed. The rotative speed of the differential housing C is still less than that of housing B because of the differential gear ratios, but considerably greater than when in low gear as previously described. The speed of gear 63, can, of course, be variable according to the volume of oil flowing through system P, and may in some instances give housing C a speed approaching that given in third speed. Between this position of the piston 134 and that shown in Fig. 20, there may be a constant change in the drive, without any fixed intermediate positions.

Third speed

Third speed position is shown in Fig. 20, where the piston has stopped with ball 181 in detent 183. In the position shown in Fig. 20 a partial flow from system Q through system P is continued, but the flow is now restricted between chamber 250 and hollow piston 134 by the backward position of the piston so that the planet gears of system Q turn sun gear 45. This drives shaft K counter-clockwise and releases gear 64 from brake 80; as gear 64 turns it increases the speed of housing C. This may be considered "third speed."

Direct drive

The direct drive position is shown in Fig. 1. The decreased resistance of the oil in the cylinder 153 due to reduced torque or turning effort delivered has now allowed spring 148 to push the piston 134 to the extreme right as indicated. Ball 181 now rests in detent 182. In this position all circulation is prevented in manifold E and likewise in manifold F while the engine is driving the vehicle. Ring chamber 201 cannot receive oil from passage 200 nor can it pass oil to ring chamber 240. Ring chamber 250 in manifold F cannot pass oil to exhaust chamber 280 nor can the oil escape through valve 195. Slot 136 allows oil to reach the valve 195, but there is no pressure behind the oil as it cannot get into the tubular piston 134 from ring chamber 250. In this position of the control valve, oil is prevented from circulating in both manifolds while the engine is driving, and consequently both systems P and Q are engaged, i. e. none of the planet gears 33, 34 or 46, 47 can rotate because the oil in their respective exhaust ducts cannot escape. Since these planet gears are all prevented from rotating, they all lock with their respective sun gears 32 and 45. The rotation of housing B consequently drives both sun gears 32 and 45 at the same speed of rotation. Rotation of sun gear 45 causes counter-clockwise rotation of shaft K and consequently counter-clockwise movement of differential sun gear 64. The counter-clockwise rotation of shaft K is permitted by brake 80 (Fig. 9) because the rolls 90 are forced against the spring pressed caps 87 and allowed to rest in the large end of the cam grooves 84, in which they have no binding action against the sleeve 91 in bearings 60 of the bracket O. The counter-clockwise rotation of differential sun gear 64 drives against differential planet gears 65 and 66 which are constantly meshed with gears 70 and 74. Gears 70 and 74 mesh with pinions 76 and 76a which in turn mesh with sun gear 63. Thus gear 64 is driving direct and gear 63 is driving at the same rate of speed in the same direction. Since the planet gears 65 and 66 cannot be rotated by gear 64, the result is that differential housing C is driven at the same speed as clutch housing B, i. e. the differential gears are locked and housing C is driven directly by the drive shafts acting in unison. Thus the driving unit drives the differential unit in direct speed. This causes the driven or output shaft H to be rotated at the same speed as the drive shaft G when the engine is driving.

*Automatic change of gears from direct toward low*

If the load on the shaft H is sufficient to reduce the speed of the motor sufficiently to warrant a change of gear ratios the lower engine speed results in an increase in the torque delivered and the transmission automatically shifts to provide the necessary gear ratio. This takes place in the following manner. When in direct drive, shaft G and shaft H are rotating at the same speeds. Increased load on shaft H slows down the rotation of shaft G and consequently the speed of the engine. The reduced engine speed causes a higher torque output which increases the pressure in the exhaust line in manifold E and a higher pressure in cylinder 153. This pressure offsets the impulse of spring 148 and, overcoming the favorable side of the cam detents, forces the piston 134 toward the lower speed setting shown in Fig. 20. If the engine is unable to maintain speed in the setting, the piston will go farther, to the setting shown in Fig. 16, or lower. Otherwise the engine will develop more power until the vehicle and engine again pick up speed and the torque is again reduced, causing a shift toward direct drive. The function of the automatic centrifugally operated valves is similar to that of the automatic valves shown in my copending application Serial No. 612,234, now Patent No. 2,502,092. The difference lies in the fact that in the present instance the open position of a valve is that in which the valve piston is in the lowermost position, rather than in an intermediate position as shown in the former application. When the engine is idling there is insufficient centrifugal force exerted on these valves and they remain in open position (Fig. 4). When the engine is speeded up enough for the purpose of starting a vehicle these valves, due to the centrifugal force provided by the housing B, are shifted from their lowermost or open position toward the outer closed position in which driving is ordinarily done (Fig. 23). When the motor is in danger of stalling, however, the reduced centrifugal force exerted by the housing B allows these valves to assume again the open position shown in Fig. 4. When partly open, they allow some slippage but also provide some resistance to increase the torque. When fully open, they allow the oil to pass from the exhaust to the intake ducts in the housing and thus by-pass the planetary gears, which become free to turn and thus cease to turn the sun gears.

The vehicle may, in view of this operation of the automatic valves, remain standing in direct drive with the engine idling. If the throttle is opened and the engine speeds up, the more rapidly turning housing B will cause these valves to start to close. The engine then provides sufficient torque at starting speeds to cause the transmission to shift. Thus if the vehicle is stationary and the transmission happens to be in direct, the increased torque provided as the engine exceeds idling speeds with the valves partly closed will ordinarily cause a shifting from direct drive downward toward low. If the vehicle is on a steep incline so that there is hardly any load and so little resistance to driving, or if the engine is not producing its rated torque, shifting may not be necessary. But usually if the vehicle is standing still manually held in low drive and the engine is idling, the opening of the throttle and the closing of the centrifugal valves will cause an increase in torque that is sufficient to prevent shifting from low toward direct drive when the pedal is released. The transmission will either shift from direct toward low, or, if it is already in a low ratio, the engine will pick up speed and the centrifugal valves will fully close. Low engine speeds without resistance produce low torque, but with resistance produce high torque. As the engine speeds near the maximum, the torque is low again. Low torque tends to shift the transmission toward direct, while high torque tends to shift it toward low.

If in any case with full open throttle the reduction in gear ratio is not sufficient to handle the load on the drive shaft H and the engine slows down, the increased torque provided by the engine increases the pressure in cylinder 153 and will cause the piston 134 to move farther to the left to a lower speed position. If then the engine speed increases sufficiently in this ratio, the torque provided by the engine lessens and the pressure decreases in cylinder 153, and allows piston 134 to be forced by the springs into or toward direct drive.

Choice of automatic or manual control

The operator is given some choice of manual or automatic control during driving. He can slow down for an intersection and come to a full stop without touching the pedal 166, and yet leave the transmission engaged. In such event, the automatic valves open and permit the vehicle to remain stationary while the engine is idling. When the operator accelerates again, the automatic relief valves are closed by centrifugal force and as they close and increase resistance the control valve is automatically placed, by a proper balance between the oil pressure and the springs before mentioned, in the correct position for the engine to drive the vehicle, depending on the torque of the engine and the load on the drive shaft H. The operator is also given two ways of setting, or influencing the setting, of the main valve. He can push the pedal 166 as far as possible to put the transmission in neutral if it happened not to be, and then release it slowly, so that the piston cannot return as far as it otherwise might, with the result that he determines the speed setting. On the other hand, he can release the pedal quickly and depend on the automatic functioning of the valve. He can tell when the piston is moved from neutral (Fig. 14) to low (Fig. 15) because spring-pressed plunger 168 is only active from neutral to low, and he can feel the difference in pressure against the pedal 166 and his foot. He likewise can sense the decreased pressure when spring 147 is not compressed. And in all of the positions indicated in Figs. 1, 15, 16 and 20, the cam detents provide stopping points sensible on pedal 166 provided the spring and oil pressures are nearly balanced. If the vehicle is at rest in direct drive and the driver wishes to start, he will close the automatic valves by opening the throttles, but, instead of letting the transmission shift automatically, he can depress the pedal to cause shifting to any desired position. While driving, furthermore, he can shift the transmission toward low or into neutral regardless of what it would do automatically, but he cannot manually shift to a higher setting. Consequently, the operator can exercise considerable control over the automatic shifting of the transmission in either direction by throttle manipulation, and control shifting toward low or into neutral by the extent to which the pedal 166 is pushed in or released. This control is particularly helpful when starting in cold weather.

Summarizing the above description, the operator must push the pedal down to put the transmission in neutral; it cannot go into neutral by itself, but the same effect is automatically achieved in one case when the automatic valves open at idling speeds. The transmission will by itself select the proper speed ratio between low and direct drive. The operator can always shift it manually toward low, but cannot shift it toward high except insofar as control over the engine speed results in control over the torque, and reduced torque causes shifting toward high.

DISPLACEMENT, SPEEDS AND RATIOS

When sun gear 32 is driving sun gear 63 and the shaft K is held by brake 88 so that gear 64 takes the torque and provides resistance enabling housing C to turn with gear 63, sun gear 45 is stationary, and its planet gears are rotated by it as housing B carries them over its surface. If the displacement of system Q were as great as that of system P the fluid forced from system Q through the conduits of system P would cause sun gear 32 to be driven twice as fast as it was going before when the housing B and gear 32 were turning at the same speed. For a proper speed ratio in second, it is desirable that sun gear 32 should not be turned so fast. Consequently, system Q should have a smaller displacement. This may be obtained by making the gears narrower in this system, as shown in Fig. 2.

The oil pressure in the main valve which determines speed settings depends on the pressure of system P. If the full power of the engine is used in each gear ratio the oil pressure in system P required to absorb the full engine torque will be most in low. It will be less in second and third as some of the engine power is required to operate system Q to force oil through system P. It will be still less in direct when both systems are driving. Since system P has an advantage in the drive over system Q, less pressure is required in system P than in system Q for the drive of the gears 63 and 64 to be in balance and for them to be locked to drive the housing C at the same rate of speed as housing B.

The springs 147, 148 and 171 combined are strong enough to hold against the pressure required in system P for low speed; springs 147 and 148 are strong enough to hold against that needed in second, and spring 148 is strong enough to hold the pressure required in direct. A reduction in pressure will cause a shifting from low toward direct; an increase over normal requirement will cause a shifting from direct toward low.

The "neutral" position of Fig. 14 provides but little resistance to the flow of oil and, consequently, to the rotation of the planet gears of systems P and Q. If the engine is idling, the centrifugal valves will also be open allowing the oil to by-pass from the pressure side to the suction side of the gears.

In second, the flow through system P is reversed; the flow through system Q is in the same direction as in neutral position. In third, some of the oil passing through valve 195 drives sun gear 32 faster than housing B is turning, but the resistance due to the partly closed opening from chamber 250 causes sun gear 45 to be driven also. In this speed, both planetary systems P and Q are driving, but there is slippage in system Q, so that it does not drive as much as when fully engaged. The speed of gear 63 is greater than in low, and the gear 64 is doing more than merely holding, so that housing C is driven at a speed that is between that of second and direct.

System P always carries a part of the load when the engine is running and the automatic relief valves are closed, so there is always pressure in cylinder 154 when the engine is working.

Engines usually deliver more torque at about 700 R. P. M. than they do at 2500 R. P. M., and their best torque is at about 1200 R. P. M. This should not be confused with power, as the engine produces more power above 2500 R. P. M. but with decreasing torque. If the engine throttle is opened wide, a transmission change to a lower gear will take place from approximately 700 to about 2400 R. P. M., (46 M. P. H.). In direct drive, an engine speed of about 1300 R. P. M. gives a vehicle speed of about 25 M. P. H., and an R. P. M. of 2350 would give approximately 45 M. P. H. A driver going over 50 M. P. H. who wishes to pick up speed will ordinarily increase the speed and power of the engine but reduce the torque so no shift will take place, assuming that there is not a great increase in the load. Rapid acceleration or extra load, of course, can make a difference, but it is believed that they will not cause a change of speed over 50 miles per hour. At an R. P. M. of about 2350 and an M. P. H. of 45, opening the throttle can still cause the engine to produce more torque, and the transmission will shift to third. The same is true of a speed of 25 M. P. H. If the lower speeds are accompanied by increased load, the additional torque will cause shifting to lower settings. When the engine and vehicle gain speed in the lower settings, until the engine reaches about 3000 R. P. M. a change back toward direct will result.

Since the intermediate detents 183 and 184 have steeper sides on the left (Fig. 20) than on the right, there is more resistance to change from second or third speed to high than from high downward. Therefore, with full open throttle, the engine has to speed up more before the transmission is changed to direct or high than it has to slow down for the transmission to shift from high to third or second. The shift from a higher to a lower speed setting takes place at a lower engine and vehicle speed than is necessary to go from low to high. The engine has to develop more power and the vehicle gain more speed before changing to high or direct drive. In terms of torque supplied by the engine, the same torque that will cause a shift downward when it is increasing will not permit an automatic shift from second or third to high when the torque is decreasing. This is emphasized because it is not considered desirable to have change take place in either direction at the same torque and speed. It should be easier for the transmission to act when shifting down to gain power than for it to shift to go toward direct. This allows a driver to utilize extra power at higher vehicle speeds, as when passing other vehicles.

If the vehicle is climbing a hill too steep for the engine in the speed setting obtaining, the turning effort required slows the engine until the engine speed is about 2200 R. P. M. or under. Then the torque delivered is high and the oil pressure is also high, and the piston 134 is moved into a lower speed setting. Assuming that this ratio is sufficient, the engine will pick up speed and power and the vehicle will go faster, until the balance of forces provided and required again reduces oil pressure and the transmission shifts back again. Such changes can take place without any manipulation of the throttle.

The transmission will not go into neutral (Fig. 14) automatically under load because of the great strength of spring 171. The fact that the transmission will not go into neutral by itself does not, however, mean that the engine will stall if the vehicle is brought to a stop, as at a red light, without depressing the pedal. When the vehicle is brought to a stop, the engine will slow down until the centrifugal valves open and permit by-passing of the oil. The vehicle will come to rest in direct drive. When the operator wishes to start, he will open the engine throttle and, as soon as the engine goes above idling speed, the automatic valves almost close and the oil pressure increases. The partly closed valves check the oil flow enough at the beginning so that the engine is prevented from excessive speeding even with full open throttle. Practically full engine torque is produced which immediately shifts the piston 134 in valve D to a lower gear position.

The gear ratio selected will depend on the turning effort required. On a hill, it might be low, while on the level second or even third might be sufficient. When under way, the automatic valves will be fully closed.

The driving effect is similar to that obtained when starting a vehicle equipped with a fluid coupling with the transmission in direct drive in that the vehicle starts gradually. But my transmission does not require a slow, as distinguished from a gradual, start. By gradual, I mean that the driven wheels are not suddenly spun. However, the vehicle picks up speed very fast. In a fluid coupling, the vehicle starts gradually and slowly picks up speed in whatever gear setting prevails. With my transmission the vehicle starts gradually (without jerking) but immediately shifts to a lower gear setting and picks up speed rapidly. When the load eases off, the transmission automatically shifts toward direct drive.

For a quick "get away" the accelerator is pushed down and held. Without losing the drive (i. e. driving continuously) the transmission will be shifted, due to the increased oil pressure, to whatever lower gear is needed to provide the power and speed. Light vehicles will usually start moving before the transmission shifts to a lower gear, while heavy vehicles will start moving before the proper setting is reached for rapid acceleration.

The efficiency of the transmission is very good, particularly in low and direct. In direct drive it should be nearly 100%.

In slow traffic where it is not practical to drive in high or where constant starting and stopping is necessary, it will be more economical to employ a greater amount of manual control instead of leaving all shifting to the automatic controls. Thus, in order to use less gasoline, the clutch pedal 166 may be held down to second speed position (as can be determined by the varying resistance of the springs) so that the vehicle will proceed uniformly at a lower speed and repeated shifting will not be necessary. Of course, the transmission can still shift to first, and the automatic valves can still open to prevent stalling, but at lower speeds than in direct.

The difference in displacement between planetary systems P and Q may be varied according to preference. However, I prefer a ratio P/Q of five to three. Because of this displacement ratio and because of the differential gear ratio between gears 63 and 64, more hydraulic pressure will be required of system Q when it drives sun gear 64 than is required of system P when it drives sun gear 63 in direct. The hydraulic flow does not, of course, do the driving, except insofar as the flow from system Q to system P speeds up gear 32.

OPERATIONAL ADVANTAGES

Although a fluid is used, with consequent smoothness of operation, there is not the slippage present in the fluid flywheel and in only two instances (intermediate drive positions) is the drive dependent at all on oil flow under pressure. The efficiency is, therefore, very high. It will also be apparent that my transmission performs both the function of a change-speed device and a clutch, some of the parts serving a double purpose and thus reducing the cost. Acting as a change speed device it is both automatically and manually operable to a considerable degree; the operator can manipulate the pedal and can also influence shifting by the manipulation of the throttle. Although the main valve will not go into neutral position by itself, or leave neutral under the impulse of its springs except when the pedal is released, the automatic valves operated by centrifugal force prevent stalling when the transmission is not in neutral and initiate shifting after an automatic release. The transmission is driving constantly during speed changes, in contrast to the usual practice of disengaging the drive between gear settings in ordinary transmissions. The vehicle starts smoothly, without jumping, because changes are initially somewhat retarded. The outlet or bore 150, the channel or groove 150a and the restricted passage 154a are small enough so that fluid in bores 139, 140 and 153 must leave under some restraint, thus slowing initially the movement of piston 134 in either direction. However, the vehicle picks up speed rapidly, because once the piston starts moving, it is not allowed to linger between speed settings. The cam sockets 182, 183, 184 and 185 (see Fig. 20) not only are designed to make it easier for piston 134 to travel to the left as viewed in Fig. 20 toward a lower speed setting than to move to the right toward a higher setting, but also are adapted to ensure that the piston will travel immediately from one station to another. In fact, once the force of the springs or the force of the oil overcomes the rise of a cam groove, the ball 181 is quickly forced into the next cam groove, so that shifting is done very rapidly. When the proper setting is attained, the vehicle is permitted to pick up speed quickly. This is partly due to the fact that the proper setting is reached promptly, and partly because system P is always driving when the transmission is in gear except when the vehicle comes to a stop with the engine idling. Thus, while the "pick up" is fast, there is no jumping as sometimes happens when, in ordinary transmissions, there is disengagement during shifting.

If the drive is reversed, as when on going down a hill the vehicle turns the engine, the auxiliary intake valves open to allow circulation in reverse, so the system is still full and the transmission operative.

Although the invention has been particularly described in connection with its use in a motor vehicle, the invention is applicable to many industrial uses either in the exact form shown or with such minor changes as will be apparent to those skilled in the art. For example, the driving unit without the differential unit will furnish a two speed two shift drive. It is not intended, therefore, to limit the scope of the invention except as required by the art and by the claims hereinafter set forth.

I claim:

1. An automatic transmission comprising, in combination, a casing, an input shaft adapted to receive power and torque, an output shaft, a drive housing, two separate planetary gear systems in said drive housing, a reservoir, means for conducting fluid from the reservoir to the planetary gears, a control valve, means for conducting fluid from said gears to said valve, automatic valves operated by centrifugal force derived from rotation of said housing interposed between said conducting means to bypass said fluid and permit the planet gears of said systems to turn when said valves are open, reciprocally movable means in said control valve adapted in one position to permit the flow of fluid from both of said planetary systems, adapted in another position to stop the flow from one of said systems but not the other, adapted in a third position to reverse the flow in one system while permitting forward flow in the other, and adapted in a fourth position to stop the flow from both planetary systems, a fluid pressure line adapted to transmit pressure due to torque derived from said input shaft from one of said planetary systems to said control means, and independent means in said control valve adapted to exert force opposed to that applied by said fluid pressure, said last named pressure and opposed force exerting means being adapted to cause said reciprocally movable means to move into and out of the above named positions to effect through fluid control the speed ratio setting of the transmission to cause it to transmit power to the output shaft with a plurality of speed ratios.

2. A transmission having, in combination, an impeller housing adapted to be driven by a suitable source of power, a rotatable differential housing, two planetary systems of gears each including a sun gear and a planet gears journaled in said impeller housing, two planetary systems of gears each including a sun gear and a planet gear journaled in said differential housing, means connecting one of the sun gears in the impeller housing with one of the sun gears in the differential housing, means connecting the other sun gear in the impeller housing with the other sun gear in the differential housing, means preventing rotation of one of said connecting means in one direction, means connecting one of the planet gears in the differential housing to the other to cause rotation of one of them to apply rotative force to the other, and hydraulic means acting selectively at different times to lock one planetary system in the impeller housing against relative rotation of its sun and planet gear, to cause relative rotation of the sun and planet gears of one planetary system in said impeller housing to increase the relative rotation of the sun gear in the other planetary system in said housing, and to lock both planetary systems in the impeller housing against relative rotation of their sun and planet gears.

3. A transmission having, in combination, an impeller housing adapted to be driven by a suitable source of power, a rotatable differential housing, two planetary systems of gears each including a sun gear and a planet gear journaled in said impeller housing, two planetary systems of gears each including a sun gear and a planet gear journaled in said differential housing, means connecting one of the sun gears in the impeller housing with one of the sun gears in the differential housing, means connecting the other sun gear in the impeller housing with the other sun gear in the differential housing, means connecting one of the planet gears in the differential housing to the other therein to cause rotation of one of them to apply rotative force to the other, means preventing rotation of one of said sun gears in one direction, and hydraulic means acting selectively at different times to lock one planetary system in the impeller housing against relative rotation of its sun and planet gear to cause said impeller to rotate said sun gear, to lock both planetary systems in the impeller housing against relative rotation of their sun and planet gears to cause said impeller to rotate both sun gears, and to cause relative rotation of the sun and planet gears of one planetary system in the impeller housing to increase relative rotation of the sun gear in the other system.

4. In an automatic transmission, in combination, a rotatable drive housing, a rotatable driven housing, two planetary gear systems each having a sun gear and a planet gear in said drive housing, means for conducting fluid to and from the teeth of said planet and sun gears, means for stopping the flow of fluid from one of said planetary systems, means for passing fluid from one of said planetary systems to the gears of the other, means for simultaneously stopping the flow of fluid from both of said planetary systems, two sun gears in said driven housing, a shaft for transmitting power from the sun gear of one of said planetary systems to a sun gear in said driven housing, a shaft for transmitting power from the sun gear of the other of said planetary systems to a second sun gear in said driven housing, means for preventing one of said shafts from rotating in one direction, a planet gear journaled in said driven housing meshing with said first named driven sun gear, a planet gear journaled in said driven housing meshing with said second named driven sun gear, and means operatively connecting said last named planet gears to cause rotative force applied to one of them to be applied also to the other.

5. In an automatic transmission, in combination, a rotatable drive housing, a rotatable driven housing, two planetary gear systems each having a sun gear and a planet gear in said drive housing, means for conducting fluid to and from the teeth of said planet and sun gears, means for stopping the flow of fluid from one of said planetary systems, means for passing fluid from one of said planetary systems to the gears of the other, means for stopping the flow of fluid from both of said planetary systems, sun gears in said driven housing, a shaft for transmitting power from the sun gear of one of said planetary systems to one of the sun gears in said driven housing, a shaft for transmitting power from the sun gear of the other of said planetary systems to another sun gear in said driven housing, means for preventing one of said shafts from rotating in one direction, a planet gear journaled in said driven housing meshing with said first named driven sun gear, a planet gear journaled in said driven housing meshing with said second named driven sun gear, and means operatively connecting said last named planet gears to cause rotative force applied to one of them to be applied also to the other, the rotation of one alone while the other is stationary causing rotation of the driven housing at a speed determined by the speed of its sun gear, and rotation of both together causing rotation of the housing at a speed determined by the speed of both sun gears.

6. In an automatic transmission, in combination, a rotatable drive housing, a rotatable driven housing, two planetary gear systems each having a sun gear and a planet gear in said drive housing, means for conducting fluid to and from the teeth of said planet and sun gears so that relative rotation thereof is permitted and rotation of said drive housing causes said planet gears to rotate axially and also bodily about said sun gears, means for stopping the flow of fluid from one of said planetary systems to prevent relative rotation of its sun and planet gear and cause rotation of said housing to turn said sun gear, means for passing fluid from one of said planetary systems to the gears of the other to accelerate the speed of the sun gear in said other system, means for stopping the flow of fluid from both of said planetary systems to prevent relative rotation of the sun and planet gears and to cause said impeller to rotate both sun gears in said driven housing, a shaft for transmitting power from the sun gear of one of said planetary systems to one of the sun gears in said driven housing, a shaft for transmitting power from the sun gear of the other of said planetary systems to another sun gear in said driven housing, means for preventing one of said shafts from rotating in one direction, a planet gear journaled in said driven housing meshing with said first named driven sun gear, a planet gear journaled in said driven housing meshing with said second named driven sun gear, and means operatively connecting said last named planet gears to cause rotative force applied to one of them to be applied also to the other, the rotation of one alone while the other is stationary causing rotation of the driven housing at a speed determined by the speed of its sun gear, and rotation of both together causing rotation of the housing at a speed determined by the speed of both sun gears.

7. A transmission as defined in claim 1 in which rotation of one of the sun gears in the driven housing acts through connective planet gearing to urge the other sun gear in the driven housing in the opposite direction.

8. A transmission as defined in claim 1 in which the means preventing rotation of one of the sun gears connecting means in one direction is an automatically operable one way brake.

9. A transmission as defined in claim 4 in which said shafts connecting the sun gears of the impeller and those of the driven housing are coaxial.

GEORGE W. JESSUP.

REFERENCES CITED

The following references are of record in the file of this patent:

UNITED STATES PATENTS

| Number | Name | Date |
|---|---|---|
| 932,843 | Bayrer | Aug. 31, 1909 |
| 1,777,103 | Murray | Sept. 30, 1930 |
| 2,050,836 | Graham | Aug. 11, 1936 |
| 2,075,118 | Krell | Mar. 30, 1937 |
| 2,124,192 | Hanson | July 19, 1938 |
| 2,154,710 | Thoma | Apr. 18, 1939 |
| 2,155,198 | Lawrence | Apr. 18, 1939 |
| 2,177,302 | Lawrence | Oct. 24, 1939 |
| 2,195,619 | Cumbus | Apr. 2, 1940 |
| 2,198,891 | Thoma | Apr. 30, 1940 |
| 2,209,949 | McCormack | Aug. 6, 1940 |
| 2,261,827 | Brown | Nov. 4, 1941 |
| 2,288,057 | Weston | June 30, 1942 |
| 2,316,390 | Bierman | Apr. 13, 1943 |
| 2,326,994 | Duffield | Aug. 17, 1943 |
| 2,377,350 | Marsh | June 5, 1945 |
| 2,423,820 | Baumann | July 15, 1947 |